(12) United States Patent
Bosak (10) Patent No.: US 7,607,677 B1
(45) Date of Patent: Oct. 27, 2009

(54) WATER AND COMPRESSED AIR STORAGE TRAILER HITCH

(76) Inventor: Kenneth J. Bosak, 19241 Napa St., Northridge, CA (US) 91324

( * ) Notice: Subject to any disclaimer, the term of this patent is extended or adjusted under 35 U.S.C. 154(b) by 498 days.

(21) Appl. No.: 11/389,592

(22) Filed: Mar. 27, 2006

(51) Int. Cl.
*B60D 1/62* (2006.01)
*B60R 19/02* (2006.01)

(52) U.S. Cl. .................. 280/420; 280/831; 293/106

(58) Field of Classification Search ............... 280/420, 280/491.5, 495, 830, 831
See application file for complete search history.

(56) References Cited

U.S. PATENT DOCUMENTS

| | | | | |
|---|---|---|---|---|
| 2,993,721 | A | * | 7/1961 | Bowman .................. 293/106 |
| 3,338,614 | A | * | 8/1967 | Sadler, Jr. ................ 293/106 |
| 3,396,983 | A | * | 8/1968 | Massey et al. ............ 280/830 |
| 3,501,190 | A | * | 3/1970 | McCrea ................... 293/117 |
| 3,764,174 | A | * | 10/1973 | Taninecz .................. 293/107 |
| 4,162,796 | A | * | 7/1979 | Mead ....................... 280/830 |
| 4,353,565 | A | | 10/1982 | Smith et al. |
| 4,487,446 | A | * | 12/1984 | Reich, II .................. 283/106 |
| 5,042,547 | A | | 8/1991 | Van De Sype |
| 5,085,468 | A | * | 2/1992 | Billotte ................... 280/831 |
| 5,131,788 | A | | 7/1992 | Hulicsko |
| 5,135,258 | A | * | 8/1992 | Buxton .................... 280/839 |
| 5,370,418 | A | | 12/1994 | Pugh |
| 5,460,420 | A | * | 10/1995 | Perkins et al. ............ 293/106 |
| 5,503,295 | A | | 4/1996 | Kotarba et al. |
| 5,551,824 | A | * | 9/1996 | Zanzig et al. ............. 414/408 |
| 5,593,167 | A | | 1/1997 | Barnhardt et al. |
| D379,343 | S | | 5/1997 | Shaw et al. |
| 5,779,289 | A | * | 7/1998 | Alexander, Jr. .......... 293/106 |

\* cited by examiner

*Primary Examiner*—Lesley D Morris
*Assistant Examiner*—Marc A Scharich
(74) *Attorney, Agent, or Firm*—Crossley Patent Law; Mark A. Crossley (57) ABSTRACT

A water and compressed air storage trailer hitch, also adaptable as a bumper and trailer hitch, providing for emergency water for both drinking and as an engine coolant. The emergency air storage is of sufficient capacity to fill tires, toys, and a host of other devices, while offering a strong trailer hitch for towing. Various embodiments with various storage capabilities and water and air inlet and outlet fitting options are offered to fit a variety of vehicles.

2 Claims, 12 Drawing Sheets

WATER AND COMPRESSED AIR STORAGE TRAILER HITCH

BACKGROUND OF THE INVENTION

There exists a need for water and compressed air storage on a vehicle, especially recreational vehicles, pickups, trucks, and off-road specialty vehicles. Until now, the storage of water or air has required some form of canister, if even possible. Extraneous canisters for water and air storage are cumbersome, can be dangerous, are difficult to locate and secure, and add additional weight to the vehicle. Sometimes, even, recreational and off-road vehicles install additional compressors driven off of their engines to attempt to have a source of additional air when needed. Otherwise, a tank or tanks must somehow be carried on or in the vehicle. Compressed air is needed for a variety of reasons. Among those are inflatable toys, inflatable boats, mattresses, tires, air for air locker differentials. Water needs are obvious and include situations requiring emergency drinking water or water for vehicle coolant. The stored water may be used under pressure.

The unique use of a trailer hitch or a hitch bumper as the storage unit for water or compressed air offers a solution to these problems.

FIELD OF THE INVENTION

The present invention relates to trailer hitches and more specifically to a water and compressed air storage trailer hitch which is also available as a bumper with hitch.

SUMMARY OF THE INVENTION

The general purpose of the water and compressed air storage trailer hitch, described subsequently in greater detail, is to provide a water and compressed air storage trailer hitch which has many novel features that result in an improved water and compressed air storage trailer hitch which is not anticipated, rendered obvious, suggested, or even implied by prior art, either alone or in combination thereof.

To attain this, the present invention comprises a storage trailer hitch. The present invention is produced for storing water, air, or both. Few production changes between the two different applications are required. Only minor additions or subtractions are capable of producing either water or air storage capability. It is also important to note that the invention often takes the place of a bumper on some vehicles, as some such vehicles combine both bumper and trailer hitch. This is dependent upon vehicular application, which is determined by make, model and year. The present invention is therefore a water or compressed air storage as a hitch or as a bumper and hitch combined. The configuration of the invention's storage capacities and arrangements vary with vehicle application. Many vehicles have spare tires centrally mounted below the frame, and require such applications as are illustrated. Some vehicles require spare tire removal for application of the present invention. Other vehicles have spare tires within or upon the bodywork, and offer the chances for increased air or water storage as shown in other embodiments. The saddle tank embodiments offer additional air and water storage for either type of vehicle. The invention is produced in a myriad of component combinations to fit a variety of needs and vehicles.

With the prevalence off road vehicle use, the air and water storage offers significant advantages compared to being without. As just one example, loss of coolant is a malady that can almost instantly disable a vehicle. Having additional water aboard is essential in such a circumstance. As further example of air storage, off road vehicles often add an engine driven compressor to air their tires. A compressor, however, has very limited function without additional air storage. The air storage offered by the invention as well as the air connects, known as quick connects in the art, offer the use of air tools, even in the most remote locations, something which can be quite valuable in countless situations. Even without an added compressor, the present invention offers enough capacity to fill flat tires.

Further, the present invention is used for a host of other needs such as filling airboats, toys, inner tubes, an almost endless list. The combination of a hitch or hitch with bumper that stores either air or water is a valuable addition that is limited in use only by imagination. Preferably, the invention is constructed of metal, typically but not limited to $3/16$ to $1/4$ inch thick, thereby typically offering pressure loading up to about 150 psi.

Thus has been broadly outlined the more important features of the improved water and compressed air storage trailer hitch so that the detailed description thereof that follows may be better understood and in order that the present contribution to the art may be better appreciated.

Numerous objects, features and advantages of the improved water and compressed air storage trailer hitch will be readily apparent to those of ordinary skill in the art upon reading the following detailed description of presently preferred, but nonetheless illustrative, embodiments of the improved water and compressed air storage trailer hitch when taken in conjunction with the accompanying drawings. In this respect, before explaining the current embodiments of the improved water and compressed air storage trailer hitch in detail, it is to be understood that the invention is not limited in its application to the details of construction and arrangements of the components set forth in the following description or illustration. The invention is capable of other embodiments and of being practiced and carried out in various ways. It is also to be understood that the phraseology and terminology employed herein are for purposes of description and should not be regarded as limiting.

One object is to provide a water and compressed air storage trailer hitch that allows for compressed air from the air storage unit to be transferred into the water storage unit thereby allowing water to be forced out under pressure thus providing a pressurized water stream suitable for fighting vehicle fires, washing vehicles or showering.

Those skilled in the art will appreciate that the concept of this disclosure may be readily utilized as a basis for the design of other structures, methods, and systems for carrying out the several purposes of the improved water and compressed air storage trailer hitch. It is therefore important that the claims be regarded as including such equivalent constructions insofar as they do not depart from the spirit and scope of the present invention.

Objects of the improved water and compressed air storage trailer hitch, along with various novel features that characterize the invention are particularly pointed out in the claims forming a part of this disclosure. For better understanding of the improved water and compressed air storage trailer hitch, its operating advantages and specific objects attained by it uses, refer to the accompanying drawings and description.

DETAILED DESCRIPTION OF THE DRAWINGS

With reference now to the drawings, and in particular FIGS. 1 through 12 thereof, embodiments of the water and compressed air storage trailer hitch employing the principles and concepts of the present invention and generally designated by the reference number 10 will be described.

Figure 1:
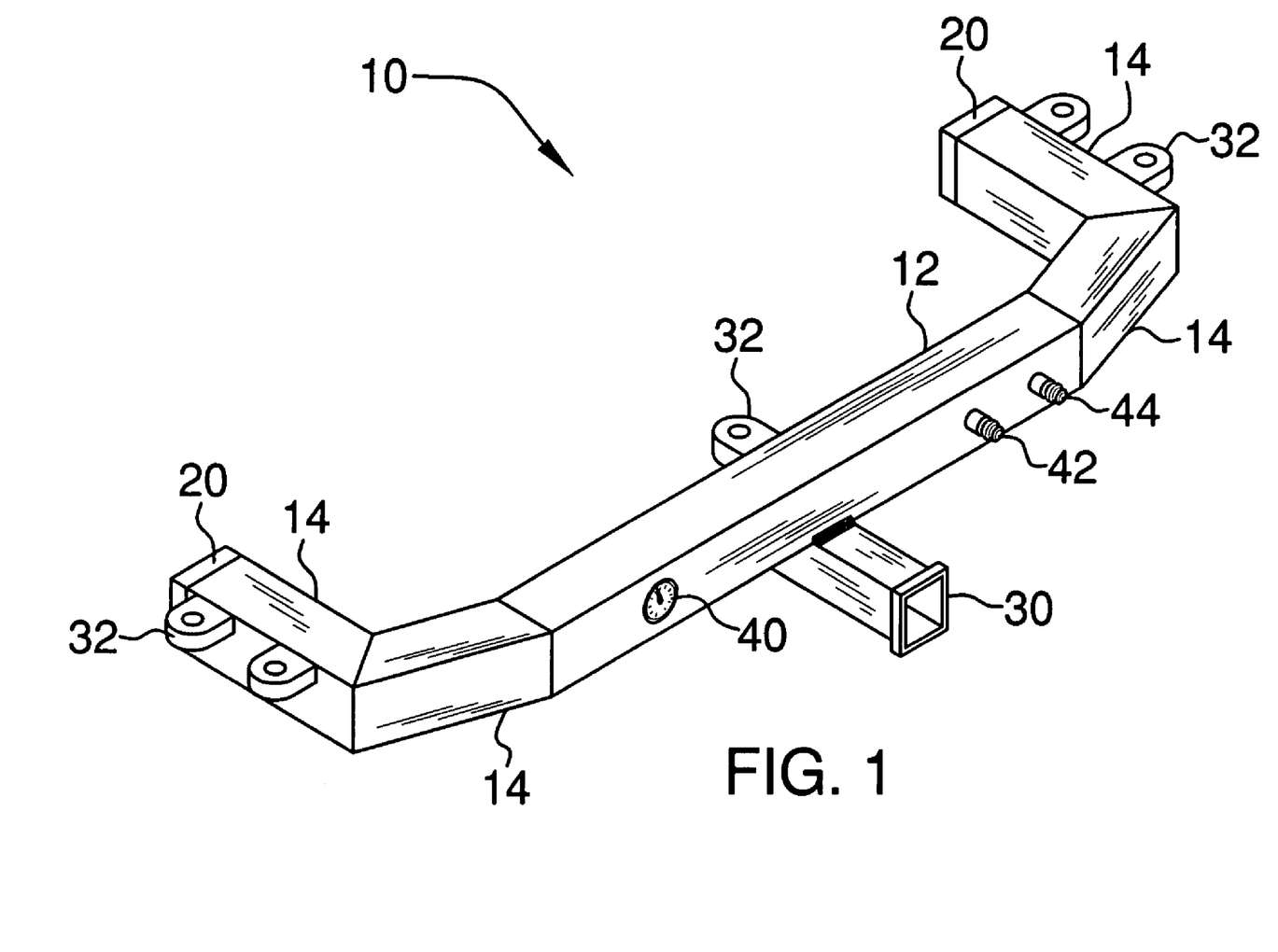
FIG. 1 is a perspective view of an embodiment of the air storage hitch built and utilized as a vehicle bumper.
Figure 3:
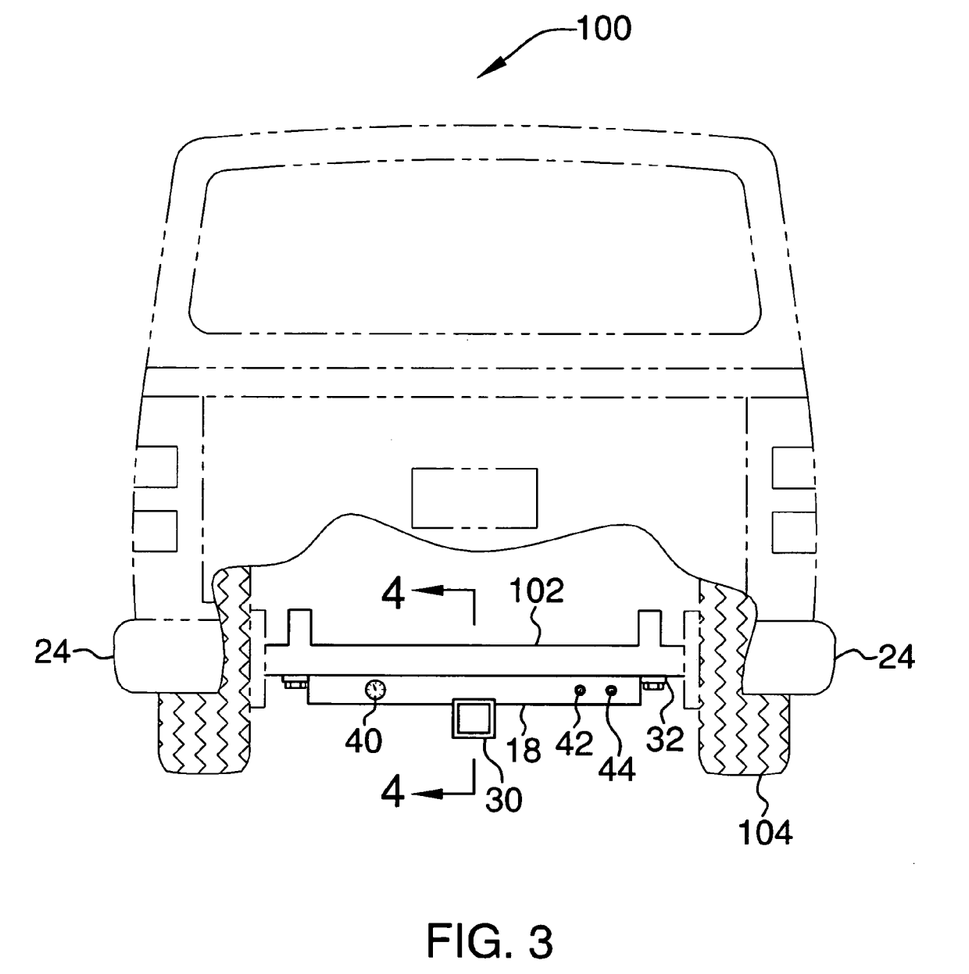
FIG. 3 is a rear elevation view of the hitch on a vehicle.

Referring to FIG. 1, the embodiment of the invention 10 has the primary storage member 12 fitted with extended storage members 14. Each separate extended storage member 14 is fitted at each end of the length of the primary storage member 12. The extended storage members 14 are each fitted at an angle to the primary storage member 12 to illustrate the adaptation of the invention 10 to a particular application vehicle 100 (FIG. 3). The embodiment is further fitted with additional outer extended storage members 14. Each additional outer extended storage member 14 is attached to the end of one of each of the more centrally disposed extended storage members 14. Each outer extended storage member 14 is therefore at a perpendicular to the primary storage member 12. Each outer extended storage member 14 is fitted with an end cap 20. The hitch receiver 30 is attached perpendicularly and centrally below the primary storage member 12. A mounting flange 32 is attached centrally to the upper rear of the primary storage member 12. A pair of mounting flanges 32 is attached upwardly to each outer extended storage member 14. The attachment of mounting flanges 32 is varied per particular vehicle 100 application. The primary storage member 12 is fitted with an air pressure gauge 40 mounted within the primary storage member 12 whereby the face of the gauge is mounted directly to an outer surface of the primary storage member. Gauge 40 location is optionally varied. The primary storage member 12 is further fitted with a primary air inlet connect 42 and the primary air outlet connect 44, beside inlet connect 42. Typically these are preferably those well known in the art as quick connects. The number of outlet connects 44 is optional, as is the location.

Figure 2:
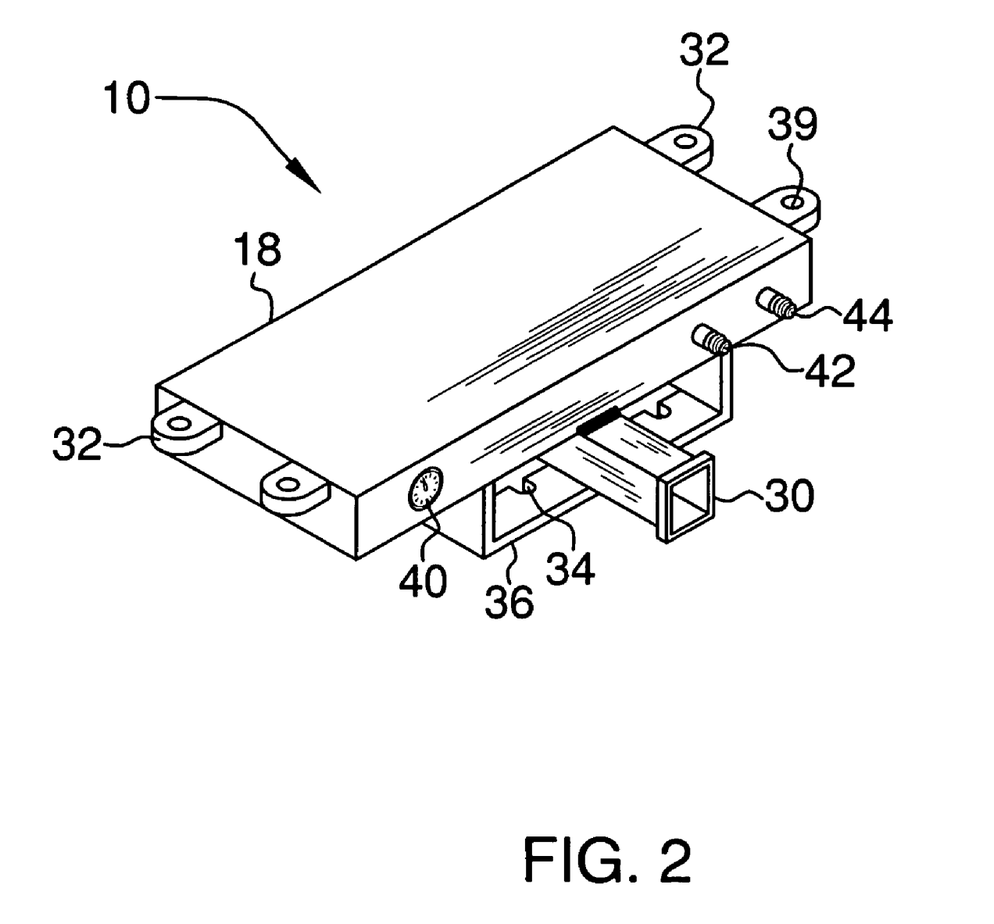
FIG. 2 is an alternate embodiment of the air storage hitch built for mounting between vehicle frame components.

Referring to FIG. 2, the embodiment of the invention 10 is equipped with a storage tank 18 that is dimensioned differently from that of FIG. 1, again to illustrate the variations required or desired to fit various vehicles 100. The embodiment is also fitted with the lower extension 36 typical of other hitches known in the art. The three-sided rectangular extension 36 is fitted with chain/cable connections 34, also typical in the art. The mounting flanges 32 are attached to the sides of the storage tank 18 for this particular application. Also fitted to the storage tank 18 are the air pressure gauge 40, inlet connect 42 and outlet connect 44.

Referring to FIG. 3, the invention 10 is fitted to the vehicle frame 102. The flanges 32 are disposed at the upper outer edges of the storage tank 18. Flanges 32 are used to bolt the invention 10 to the frame 102. The embodiment of the invention 10 is equipped with the storage tank 18 that is more centrally disposed and unlike that of the embodiment of FIG. 1. This is typical of an application of the invention 10 which is fitted to a vehicle 100 with a spare tire 104 located below the frame 102. The hitch receiver 30 is disposed in a typical position along and below the primary storage member 12. Facing the air pressure gauge 40, the inlet connect 42, and the outlet connect 44 to the rear of the vehicle 100 is typical of installation due to shielding from road debris and the like. Again, the location of the inlet connect 42, outlet connect 44, and air pressure gauge 40 are optional. The saddle tanks 24 are disposed behind the vehicle tires 104 in this embodiment of the invention 10.

Figure 4:
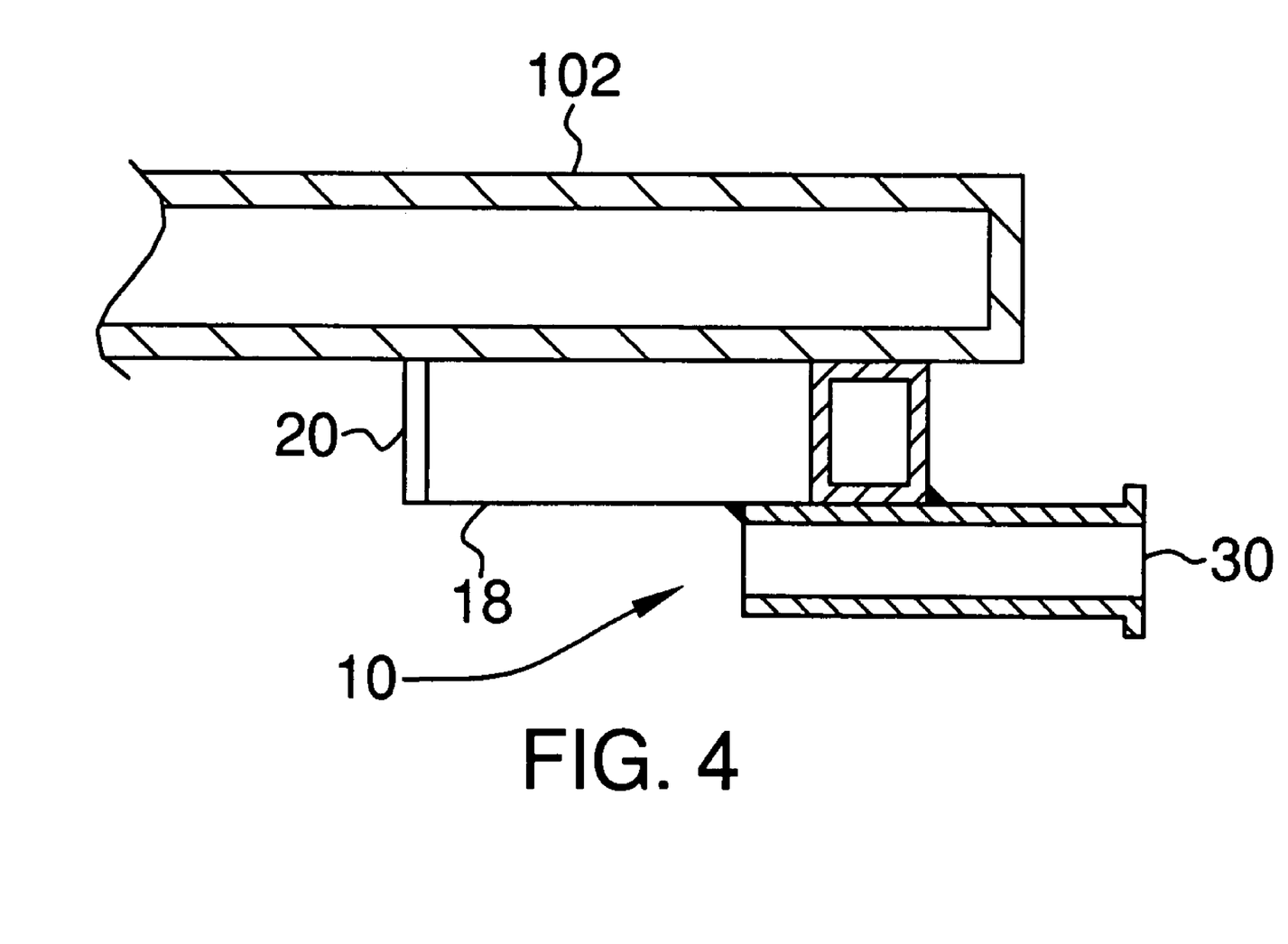
FIG. 4 is cross sectional view of FIG. 3, taken along the line 4-4.

Referring to FIG. 4, the partial cross sectional embodiment of FIG. 3 illustrates the hitch receiver 30 positioning typical of the invention 10 on a given vehicle 100. The extended depth of the storage tank 18 provides for spreading the mounting flanges 32 (FIG. 3) both fore and aft along the frame 102, thereby providing for strength of mounting of the invention 10.

Figure 5:
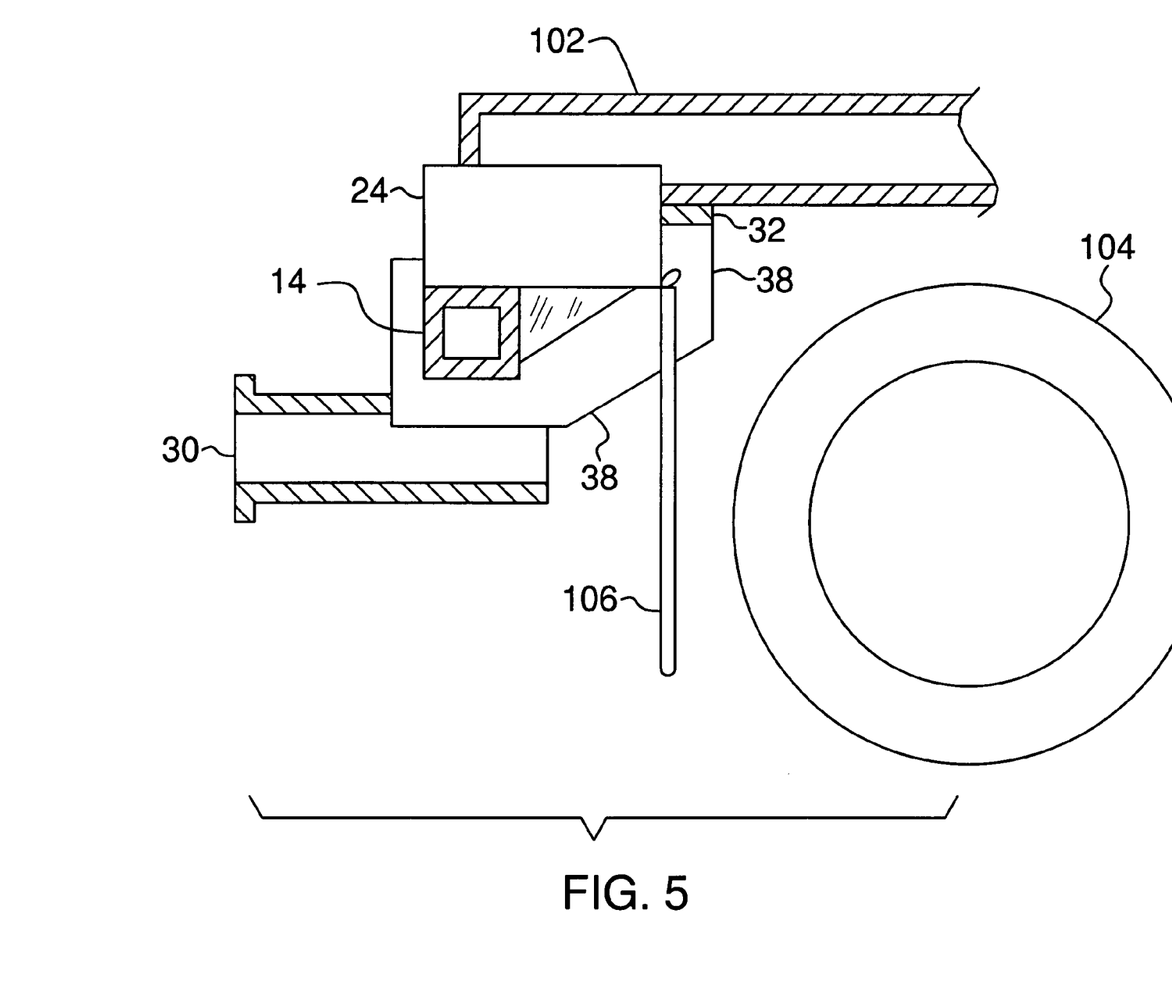
FIG. 5 is a side elevation view of an embodiment equipped with saddle tanks.

Referring to FIG. 5, a partial cross sectional view of the invention 10 showing mud flaps 106 disposed on the saddle tanks 24. The mud flaps 106 are thereby conveniently affixed behind the tires 104 of the vehicle 100. The embodiment also features the extended mount 38, resembling that of FIG. 7. The extended, angular construction of the extended mount 38 provides additional strength in the attachment of the invention 10 in various vehicle 100 applications. Mount 32 is fastened to frame 102. The particular extended mount 38 shown wraps around the primary storage member 14 for greater strength.

Figure 6:
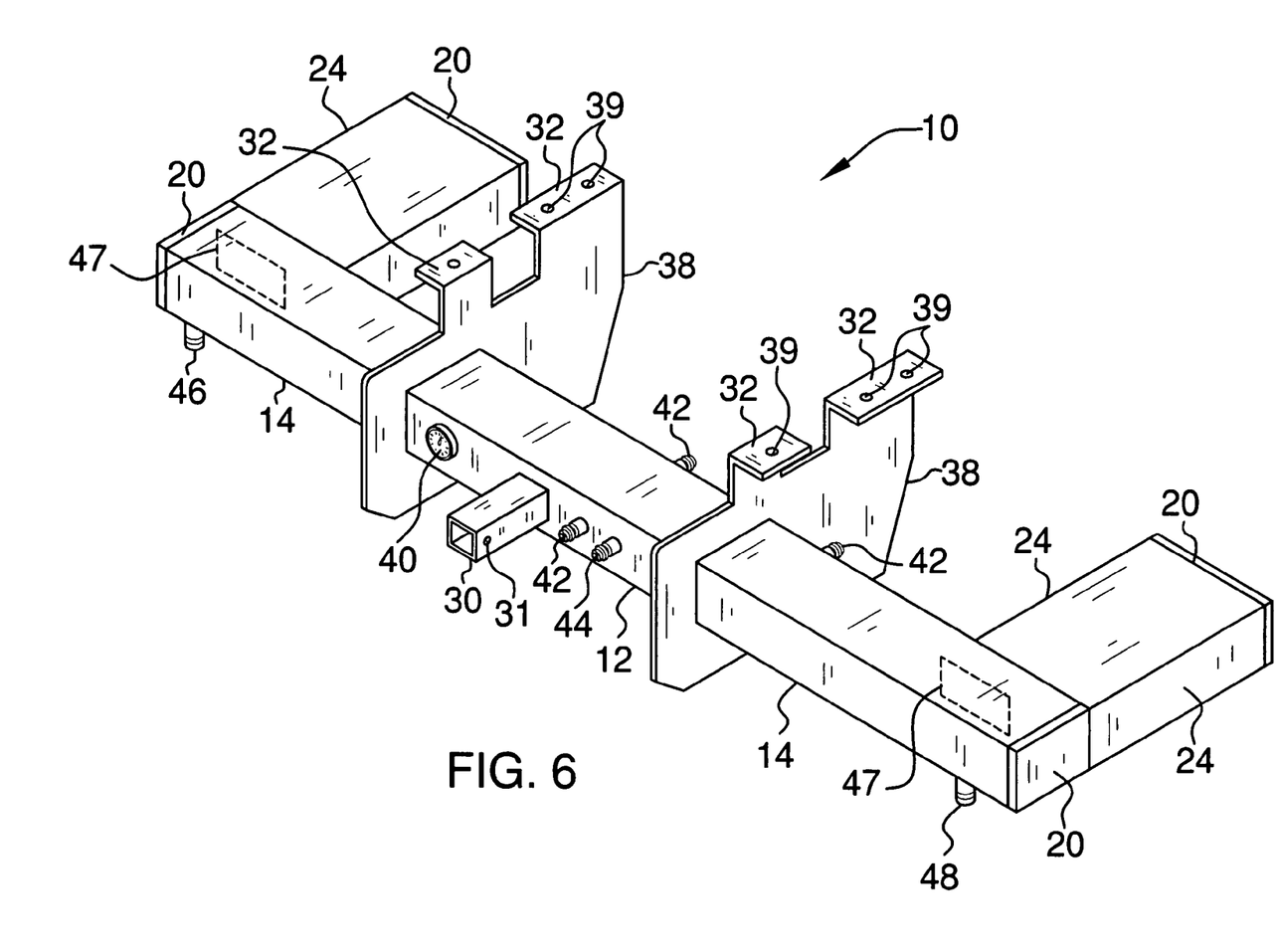
FIG. 6 is a perspective view of an embodiment fitted with saddle tanks.

Referring to FIG. 6, the embodiment is similar to that of FIG. 5 with the exception of the disposition of the saddle tanks 24 positioning. Each saddle tank 24 is affixed to the outer end of one of the extended storage members 14. The extended storage tanks 24 are perpendicular to the primary storage member 12 and the extended storage members 14. Each extended storage member 14 is fitted with an end cap 20. Each saddle tank 24 is affixed with an end cap 20. A transfer 47 joins each saddles tank 24 with each extended storage member 14 respectively. With the hollow construction of the primary storage tank 12, the extended storage tanks 14, and the saddle tanks 24, air or water is, or air and water are stored, depending upon the application. The spaced apart extended mounts 38 are fitted around the primary storage member 12. Each extended mount 38 is fitted with a plurality of mounting flanges 32 which are at a rig ht angle to the extended mount 38 body, there by affording fastening to a given vehicle 100 frame 102. Mount holes 39 are provided for bolting to a frame 102. This embodiment of the invention 10 uses an extended mount 38 with different mounting flanges 32. This particular extended mount 38 features a dual mount hole 39 flange 32 toward the front of a vehicle 100, and a single mount hole 39 flange 32 toward the rear of a vehicle 100. The hitch receiver 30 is perpendicularly affixed in the back outer center of the primary storage member 12. Hitch pin orifice 31 of hitch receiver 30 is known in the art. The air pressure gauge 40 is located proximal to the hitch receiver 30. The air connect 42 and secondary air connect 44 are disposed between the hitch receiver 30 and one extended mount 38. The outer bottom of the driver side of the extended storage member 14 features the pressure relief valve (PRV) 46. The outer bottom of the opposite extended storage member 14 features the petcock drain 48. The drain 48 in this embodiment of the invention 10 can be used to drain condensation from compressed air stored in the invention 10.

Figure 7:
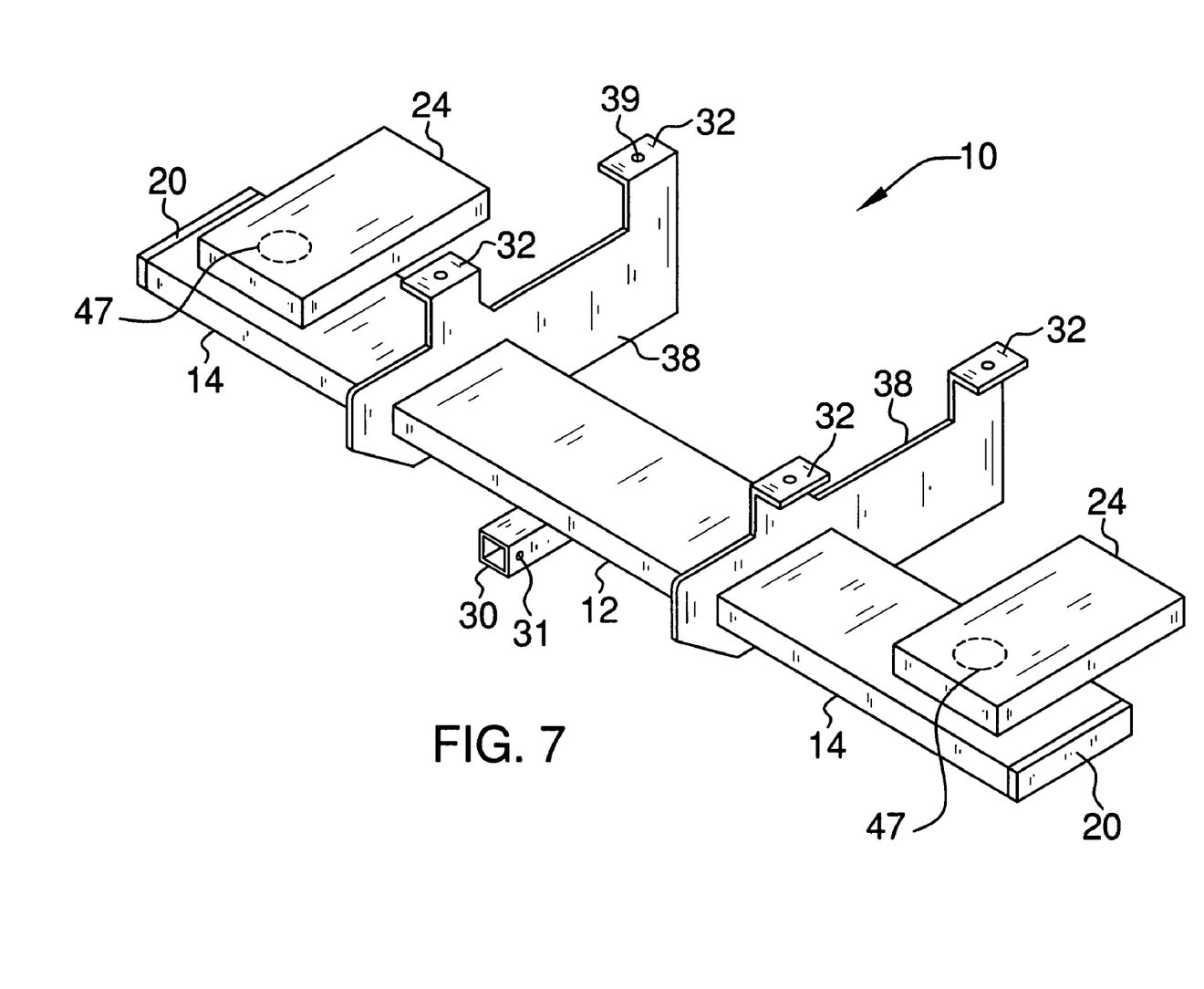
FIG. 7 is a perspective view of the hitch fitted with saddle tanks mounted atop the extended storage members.

Referring to FIG. 7, the embodiment of the invention 10 is similar to that represented in FIG. 6. The saddle tanks 24, though, are affixed atop and proximal to the outer ends of the extended storage tanks 18. A transfer 47 provides communication between each saddle tank 24 and each extended storage member 14 respectively. The hitch receiver 30 is perpendicularly affixed below the primary storage member 12. Each spaced apart extended mount 38 is equipped with two spaced apart mounting flanges 32. This embodiment of the invention 10 with the extended mounts 38 wrapped around the primary storage member 12 is produced to mount below a bumper of a vehicle 100. Other embodiments of the invention (not shown) are sometimes equipped with extended mounts 38 which do not wrap around the primary storage member 12, thereby featuring a smooth outer surface to better serve as a bumper. Combining bumpers with trailer hitches is well known in the art. Both FIGS. 6 and 7 are embodiments of the invention 10 which might be used on a vehicle 100 with a spare tire 104 mounted below and in the center of the vehicle 100. Some vehicles 100 require spare tire 104 removal, a necessity that is vehicle 100 specific. A plurality of inlet connects 42 illustrates optional locations as well as numbers of same.

Figure 8:
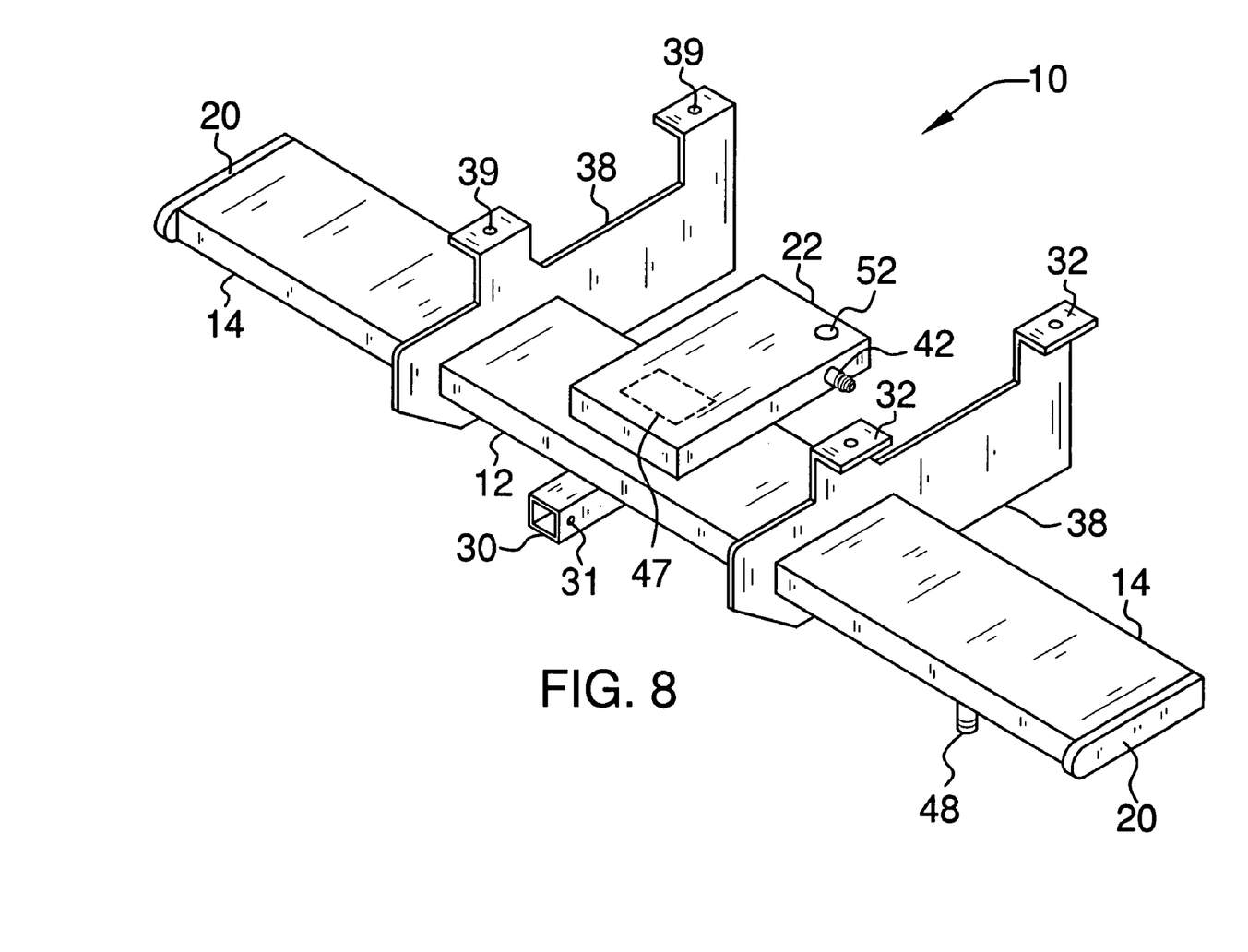
FIG. 8 is a perspective view of an embodiment fitted with a center storage.

Referring to FIG. 8, the embodiment of the invention 10 features two communicating storage features. The primary storage member 12 is centrally positioned with extended storage members 14 on either end. The additional center storage 22 is positioned both above and forwardly from atop the primary storage member 12. The hitch receiver 30 is centrally affixed below the primary storage member 12.

The transfer 47 provides communication between the primary storage member 12 and the center storage 22. It is significant that several embodiments of the invention 10 provide for air and water storage. FIG. 8's embodiment illustrates the potential of both air and water storage. Water can be introduced to the invention 10, as well as air. Air can be introduced, as example, via inlet connect 42. The air pressurizes water introduced into the invention 10 via removal of fill cap 52. The water assumes a lower position within the invention 10 via gravity, and can be outletted via petcock 48. This feature optionally applies to any embodiment of the invention 10.

Figure 9:
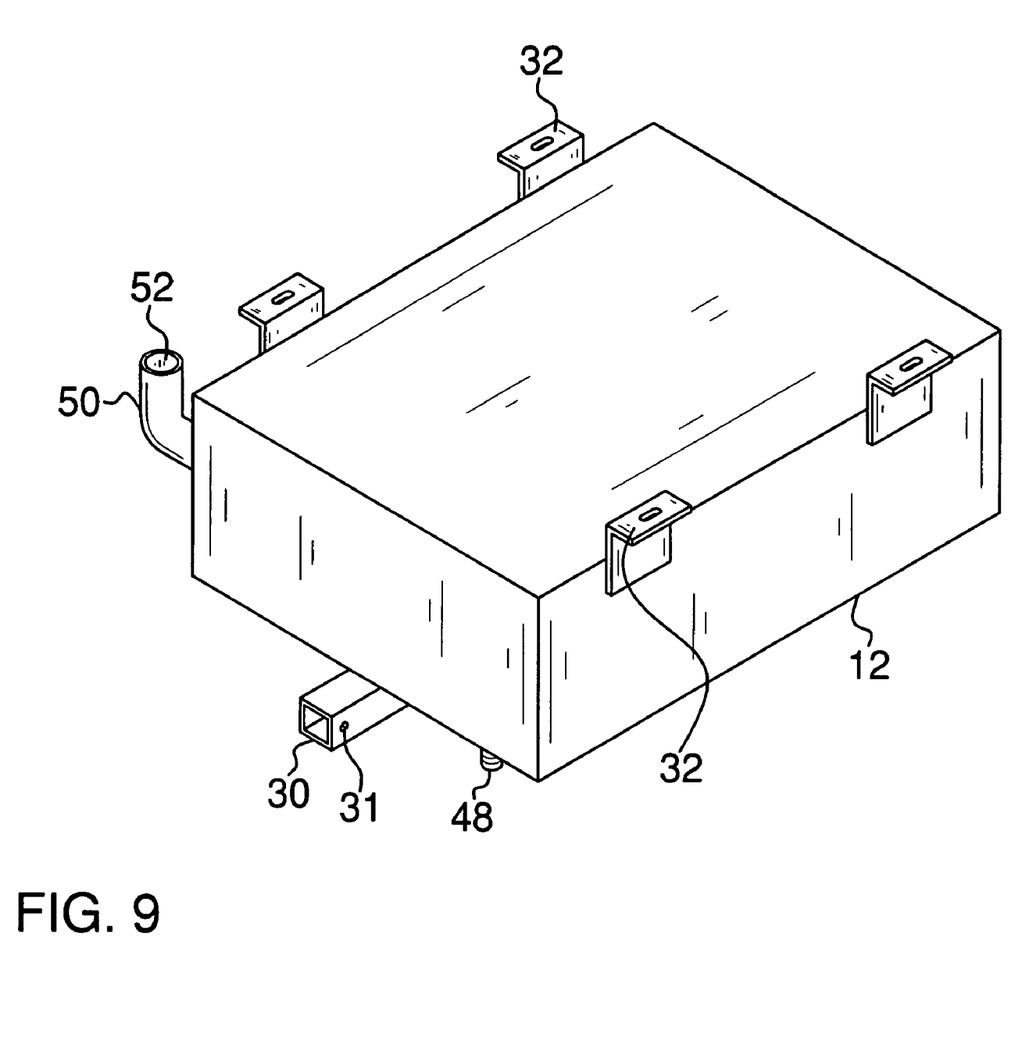
FIG. 9 is a perspective of the water storage embodiment.

Referring to FIG. 9, an embodiment of the invention 10 used for water storage illustrates the optional omission of the pressure relief valve 46, the air connect 42, the secondary air connect 44, and the pressure gauge 40. The pressure gauge 40 may be substituted with a water level gauge (not shown). All other embodiments of the invention 10, as those illustrated in FIGS. 1-8 are offered in identical optional configurations for water storage. A further option is featured in the water use embodiments of the invention 10. The interior of the primary storage members 12, the extended storage members 14, and the saddle tanks 24, as well as the storage tank 18 are coated with a water proof, sanitary coating (not shown). This insures drinkable water when needed. The fill tube 50 is located, in the illustration, on the rear driver side of the invention 10. The fill tube 50 is topped by fill cap 52. The fill tube 50 is, in other embodiments of the invention 10 for other vehicle 100 applications, located as needed.

Figure 10:
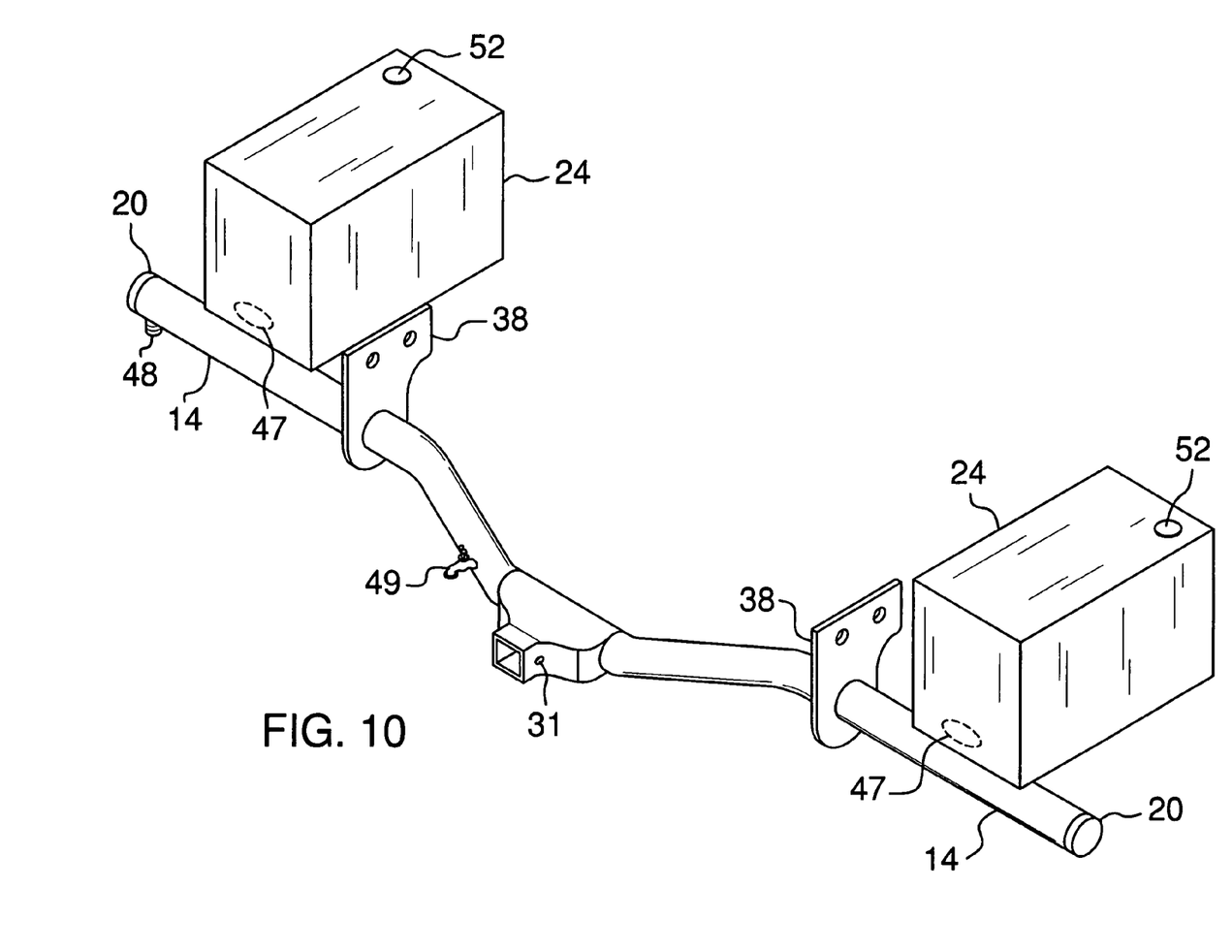
FIG. 10 is a perspective view of a tubular primary storage member embodiment with saddle tanks.

Referring to FIG. 10, the additional embodiment of the invention 10 features tubular primary storage member 12 and extended storage members 14. Each extended storage member 14 joins at either end, respectively, of the primary storage member 12. Each extended storage member 14 joins at the location of the extended mounts 38, respectively, in this embodiment illustration. Dependant upon the vehicle 100 application, extended mount 38 locations vary. Each saddle tank 24 communicates with an extended storage member 14 via a transfer 47. This transfer 47 communication is typical of the other embodiments of the invention 10 wherein such applies. The outflow 49 is provided for water outlet. The drain petcock 48 is also provided, as example, on one of the extended storage members 14. Again, the petcock 48 and outflow 49 locations are optional.

Figure 11:
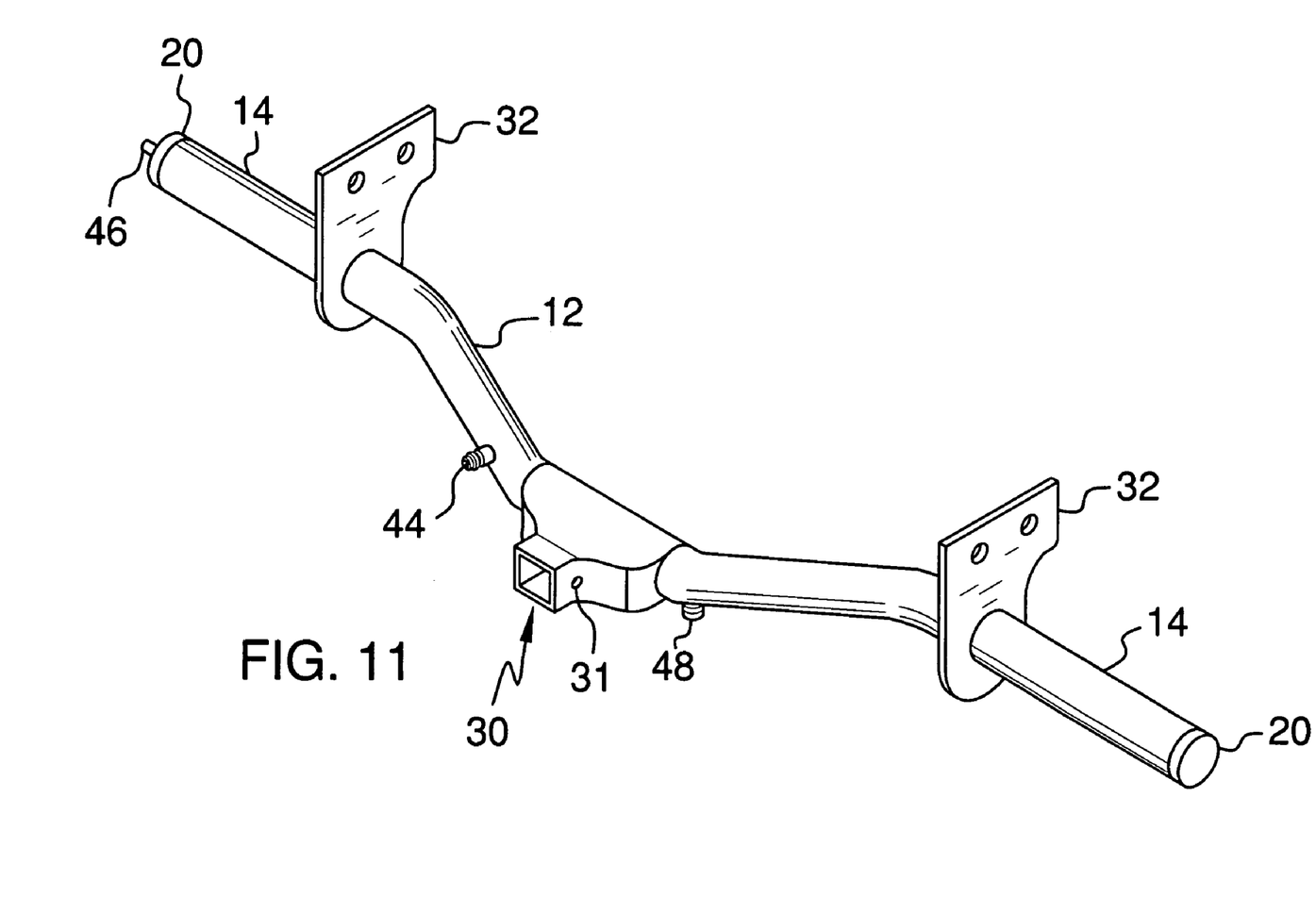
FIG. 11 is a perspective view of an embodiment with tubular extensions on the tubular primary storage member.

Referring to FIG. 11, the extended storage members 14 are positioned specifically for a particular vehicle 100 application. The PRV 46 location is provided as an example of optional variation of same. The outlet connect 44 is, in this embodiment, disposed substantially medially on the primary storage member 12, as is the drain petcock 48, on an opposing side of the hitch receiver 30.

Figure 12:
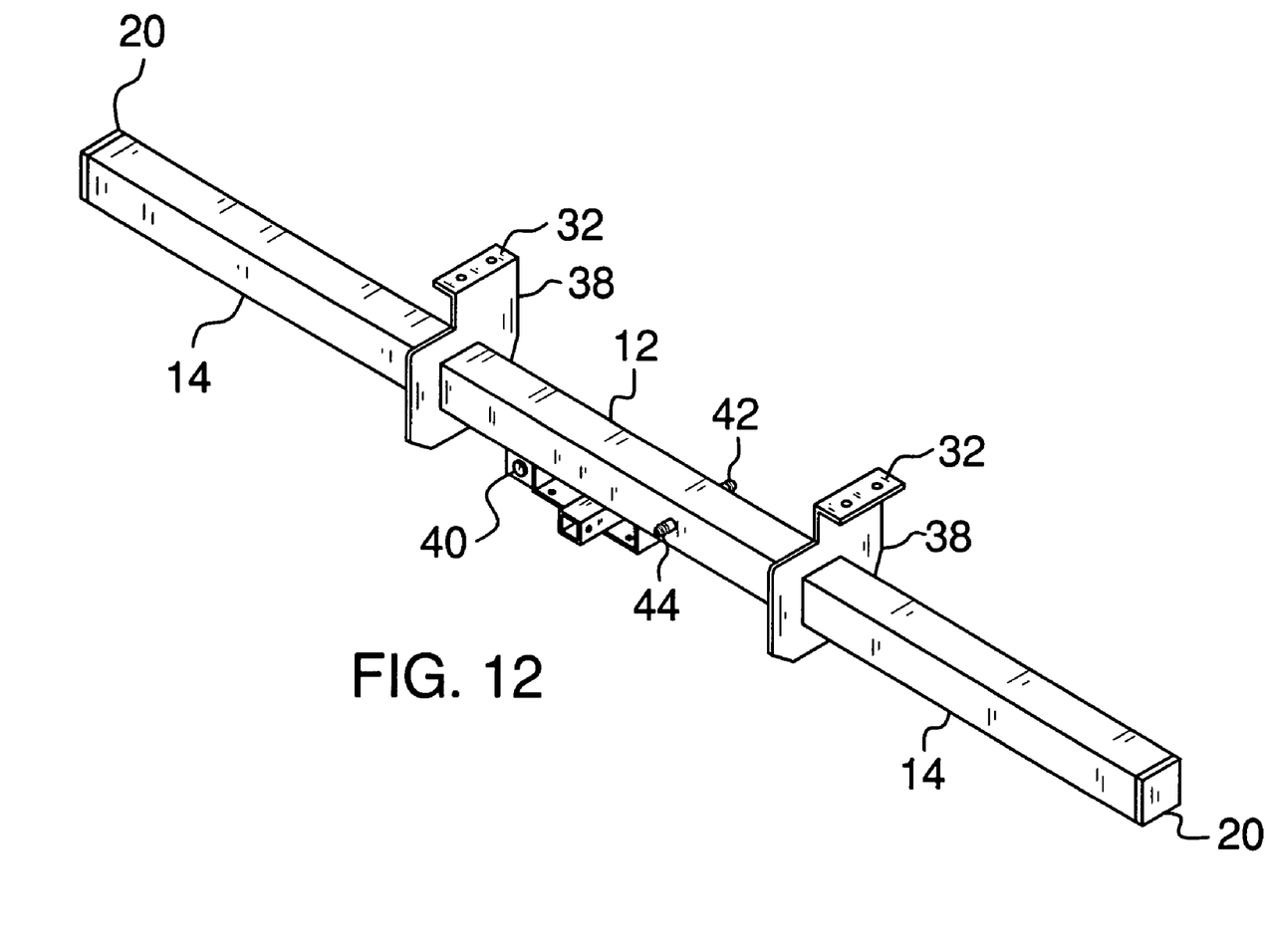
FIG. 12 is a perspective view of an embodiment

Referring to FIG. 12, an embodiment of the invention 10 is featured which omits saddle tanks 24. Reasons for saddle tank 24 omissions can be either by choice or for necessity for fitment to a vehicle 100. Connects 42 and 44 locations and numbers are optional.

The various features detailed in the above described illustrations of the invention 10 can be combined as needed for various vehicle 100 applications and for user preferences, a significant advantage of the invention 10 in meeting needs and desires.

With respect to the above description then, it is to be realized that the optimum dimensional relationships for the parts of the water and compressed air storage trailer hitch, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the present invention may be used.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A trailer hitch having compressed air storage and water storage, the hitch for vehicular frame attachment, the hitch comprising:

a hollow parallelepiped hitch receiver for receiving a matching trailer insert;

a hitch pin orifice within the hitch receiver;

a storage member, the storage member attached perpendicularly to the hitch receiver;

a plurality of mounting flanges attached to the storage member, the mounting flanges for attaching the hitch to the vehicle frame;

an air inlet connect, the air inlet connect communicating with the storage member;
an air outlet connect, the air outlet connect communicating with the storage member;
a pressure relief valve communicating with the storage member;
a water inlet of the storage member;
a water outlet of the storage member;
wherein the storage member further comprises an air pressure gauge mounted within the primary storage member whereby the face of the gauge is mounted directly to an outer surface of the primary storage member.

2. The hitch in claim 1 wherein the storage member further comprises a drain petcock.

* * * * *